United States Patent
Faith

(10) Patent No.: US 10,790,650 B2
(45) Date of Patent: Sep. 29, 2020

(54) CONDUIT ROUTING SYSTEM

(71) Applicant: Icenine Industries, LLC, Bellevue, WA (US)

(72) Inventor: Dean M. Faith, Bellevue, WA (US)

(73) Assignee: Icenine Industries, LLC, Bellevue, WA (US)

(*) Notice: Subject to any disclaimer, the term of this patent is extended or adjusted under 35 U.S.C. 154(b) by 233 days.

(21) Appl. No.: 16/030,194

(22) Filed: Jul. 9, 2018

(65) Prior Publication Data

US 2020/0014181 A1  Jan. 9, 2020

(51) Int. Cl.
*H02G 3/04* (2006.01)
*H02G 3/34* (2006.01)

(52) U.S. Cl.
CPC ......... *H02G 3/0437* (2013.01); *H02G 3/0418* (2013.01); *H02G 3/34* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,756,023 A * | 4/1930 | Felsenthal | ............. | E04F 11/181 138/156 |
| 2,087,640 A * | 7/1937 | Du Prey | ............. | H02G 3/0437 174/101 |
| 3,262,083 A * | 7/1966 | Gooding | ................. | E04F 19/04 439/216 |
| 3,433,270 A * | 3/1969 | Fischer | ..................... | E04B 5/48 138/162 |
| 3,697,667 A * | 10/1972 | Pollak | .................. | H02G 3/0431 174/68.3 |
| 3,761,603 A * | 9/1973 | Hays | ...................... | H02G 3/045 174/101 |
| 3,782,420 A | 1/1974 | Kolb | | |
| 3,786,171 A * | 1/1974 | Shira | .................... | H02G 3/0425 174/504 |
| 4,374,596 A * | 2/1983 | Schlemmer | ............. | H02G 3/06 138/155 |

(Continued)

FOREIGN PATENT DOCUMENTS

EP  0682394  11/1995
EP  0921616  6/1999

*Primary Examiner* — Binh B Tran
*Assistant Examiner* — Krystal Robinson
(74) *Attorney, Agent, or Firm* — Neustel Law Offices

(57) ABSTRACT

A conduit routing system for easily and efficiently routing, concealing, and securing conduits along a structure. The conduit routing system generally includes a channel member adapted to be secured against a structure such as a wall. The channel member may include a channel in which conduits may be secured and routed. The channel member may include a pair of connectors; each including an inner receiver slot and an outer receiver slot. A cover may be secured to the channel member by engaging with the outer receiver slots. A securing member for retaining the conduits within the channel member may be secured to the channel member by engaging with the inner receiver slots. Connector strips such as double-sided tape may additionally secure the cover to the channel member. A number of different couplers may be utilized which are secured over the channel member and the cover.

16 Claims, 14 Drawing Sheets

(56) References Cited

U.S. PATENT DOCUMENTS

| | | | | |
|---|---|---|---|---|
| 4,589,449 A * | 5/1986 | Bramwell | H02G 3/0608 | 138/157 |
| 4,602,124 A * | 7/1986 | Santucci | H01R 25/162 | 138/157 |
| 4,918,886 A | 4/1990 | Benoit | | |
| 4,951,716 A * | 8/1990 | Tsunoda | H02G 3/0418 | 138/157 |
| 5,134,250 A * | 7/1992 | Caveney | H02G 3/0418 | 138/162 |
| 5,235,136 A * | 8/1993 | Santucci | H02G 3/266 | 174/101 |
| 5,406,762 A | 4/1995 | Buard | | |
| 5,523,529 A * | 6/1996 | Holliday | H02G 3/0418 | 138/163 |
| 5,535,787 A * | 7/1996 | Howell | H02G 3/0487 | 138/110 |
| 5,753,855 A * | 5/1998 | Nicoli | H02G 3/0608 | 138/157 |
| 6,143,984 A * | 11/2000 | Auteri | H02G 3/0608 | 174/101 |
| 6,156,977 A * | 12/2000 | Benito-Navazo | H02G 3/0608 | 138/162 |
| 6,188,024 B1 | 2/2001 | Benito-Navazo | | |
| 6,284,975 B1 * | 9/2001 | McCord | G02B 6/4459 | 174/481 |
| 6,323,421 B1 * | 11/2001 | Pawson | H02G 3/0418 | 174/503 |
| 6,437,244 B1 * | 8/2002 | Vander Velde | H02G 3/0418 | 174/101 |
| 6,693,238 B2 | 2/2004 | Jadaud | | |
| 6,972,367 B2 | 12/2005 | Federspiel | | |
| 7,041,898 B2 | 5/2006 | Stempinski | | |
| 7,223,925 B2 | 5/2007 | Ewer | | |

* cited by examiner

CONDUIT ROUTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a conduit routing system for easily and efficiently routing, concealing, and securing conduits along a structure.

Related Art

Any discussion of the related art throughout the specification should in no way be considered as an admission that such related art is widely known or forms part of common general knowledge in the field.

Conduit routing systems, sometimes referred to as "raceways", are in common use for routing conduits in a wide range of industries, including for home use. With the advent of complicated home media systems, it has become increasingly difficult to properly route and conceal the many conduits necessary to interconnect all of the components of the media systems. Offices with a large number of computers or other devices similarly require large numbers of conduits to be routed around a space. Industrial areas, such as factories, encounter the same issues.

In the past, cable raceways have been utilized to secure, conceal, and route such conduits. However, previously-used cable raceways suffer from a number of shortcomings. They can be extremely difficult and unwieldy to install. They also require an excessive measurement activities and a high degree of accuracy during layout and a high degree of accuracy in the length of custom cut raceway sections. They typically require measuring and pre-drilling of holes in the raceways when mounting them with screw or nail fasteners. Additionally, vertical sections of raceway often exhibit sagging of the cover which can expose the conduits secured thereunder.

SUMMARY

An example embodiment is directed to a conduit routing system. The conduit routing system includes a channel member adapted to be secured against a structure such as a wall. The channel member may include a channel in which conduits may be secured and routed. The channel member may include a pair of connectors; each including an inner receiver slot and an outer receiver slot. A cover may be secured to the channel member by engaging with the outer receiver slots. A securing member for retaining the conduits within the channel member may be secured to the channel member by engaging with the inner receiver slots. Connector strips such as double-sided tape may additionally secure the cover to the channel member. A number of different couplers may be utilized which are secured over the channel member and the cover to accomplish various bend angles and intersections while covering what would otherwise be exposed cables, cords or wires.

There has thus been outlined, rather broadly, some of the embodiments of the conduit routing system in order that the detailed description thereof may be better understood, and in order that the present contribution to the art may be better appreciated. There are additional embodiments of the conduit routing system that will be described hereinafter and that will form the subject matter of the claims appended hereto. In this respect, before explaining at least one embodiment of the conduit routing system in detail, it is to be understood that the conduit routing system is not limited in its application to the details of construction or to the arrangements of the components set forth in the following description or illustrated in the drawings. The conduit routing system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
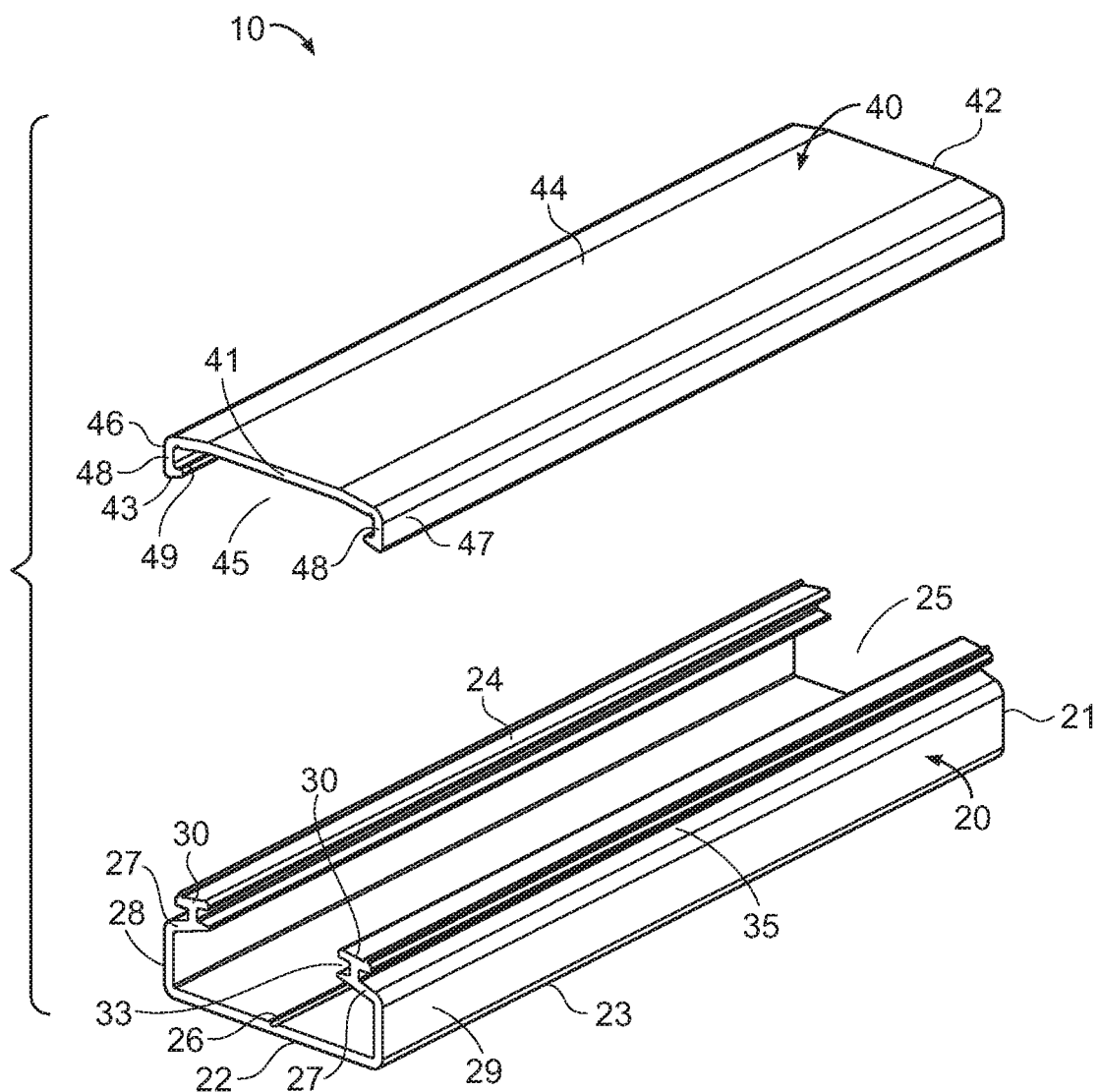
FIG. 1 is a perspective view of a conduit routing system in accordance with an example embodiment.

A. Overview.

An example conduit routing system 10 generally comprises a channel member 20 for securing one or more conduits 12 to a structure 16 such as a wall. The channel member 20 may comprise a base 23, a first sidewall 28, a second sidewall 29, and a channel 25 defined between the base 23, the first wall 28, and the second sidewall 29. The base 23 may be adapted to be connected to a structure 16. The channel member 20 may include a first connector 30 on the first sidewall 28 of the channel member 20; with the first connector 30 comprising a first inner receiver slot 33. The channel member 20 may include a second connector 30 on the second sidewall 29 of the channel member 20; the second connector 30 comprising a second inner receiver slot 33. A cover 40 may be removably connected to the channel member 20 to as to selectively cover the channel 20. A securing member 70 adapted to secure the one or more conduits 12 within the channel 20 may be connected between the first inner receiver slot 30 and the second inner receiver slot 30.

The first connector 30 may comprise a first outer receiver slot 35 and the second connector 30 may comprise a second outer receiver slot 35. The cover 40 may be removably connected to the first outer receiver slot 35 and the second outer receiver slot 35. The cover 40 may comprise a first cover connector 49 adapted to removably engage with the first outer receiver slot 35 and a second cover connector 49 adapted to removably engage with the second outer receiver slot 35.

A coupler 50, 60, 61, 62, 63 may be provided to link multiple channel members 20 together. The coupler 50, 60, 61, 62, 63 may be removably connected over the channel member 20 and the cover 40. The coupler 50, 60, 61, 62, 63 may comprise a first coupler connector 58 and a second coupler connector 58; each being adapted to engage between the cover 40 and the channel member 20 to secure the coupler 50, 60, 61, 62, 63 over the cover 40 and the channel member 20. The coupler 50, 60, 61, 62, 63 may comprise a plurality of positioning notches 66, 67, including centerline positioning notches 66 which may be used to align the coupler 50, 60, 61, 62, 63 on the structure 16 with centerline markings 17 and edge locator positioning notches 67 which may be utilized to signify positioning of the respective ends 21, 22 of the channel member 20 during the layout stage of installation. The coupler 50, 60, 61, 62, 63 may comprise a wide range of types of couplers, including a straight coupler 50, a flat elbow coupler 60, an inside elbow coupler 61, an outside elbow coupler 62 and a three-way coupler 63.

A connector strip 74 may be connected between the channel member 20 and the cover 40. The connector strip 74 may comprise double-sided tape and may extend across the channel 25 of the channel member 20. In an alternate embodiment, a first connector strip 74 may be connected between the first connector 30 and the cover 40 and a second connector strip 74 may be connected between the second connector 30 and the cover 40. The first connector 30 and the second connector 30 may each comprise an elongated T-shaped member.

Another exemplary embodiment may comprise a channel member 20 for securing one or more conduits 12 to a structure 16 such as a wall. The channel member 20 may comprise a base 23, a first sidewall 28, a second sidewall 29, and a channel 25 defined between the base 23, the first wall 28, and the second sidewall 29. The base 23 may be adapted to be connected to a structure 16. The channel member 20 may include a first T-shaped connector 30 on the first sidewall 28 of the channel member 20; the first T-shaped connector 30 comprising a first inner receiver slot 33 and a first outer receiver slot 35. The channel member 20 may also include a second T-shaped connector 30 on the second sidewall 29 of the channel member 20; the second T-shaped connector 30 comprising a second inner receiver slot 33 and a second outer receiver slot 35.

A cover 40 may be removably connected to the channel member 20 so as to selectively cover the channel 25, wherein the cover 40 is adapted to engage with the first outer receiver slot 35 and the second outer receiver slot 35 of the channel member 20. A securing member 70 adapted to secure the one or more conduits 12 within the channel 20 may be connected between the first inner receiver slot 30 and the second inner receiver slot 30. The securing member 70 may comprise a resilient, elongated member. The first and second T-shaped connectors 30 may each comprise a rib 31 and a flange portion 32 at an upper end of the rib 31. The flange portion 32 of the first T-shaped connector 30 may define the first inner and outer receiver slots 35 and the flange portion 32 of the second T-shaped connector may define the second inner and outer receiver slots 35. The connector strip 74 may be connected between the channel member 20 and the cover 40; with the connector strip 74 being connected to the flange portion 32 of the first T-shaped connector 30 and the flange portion 32 of the second T-shaped connector 30.

Figure 16:
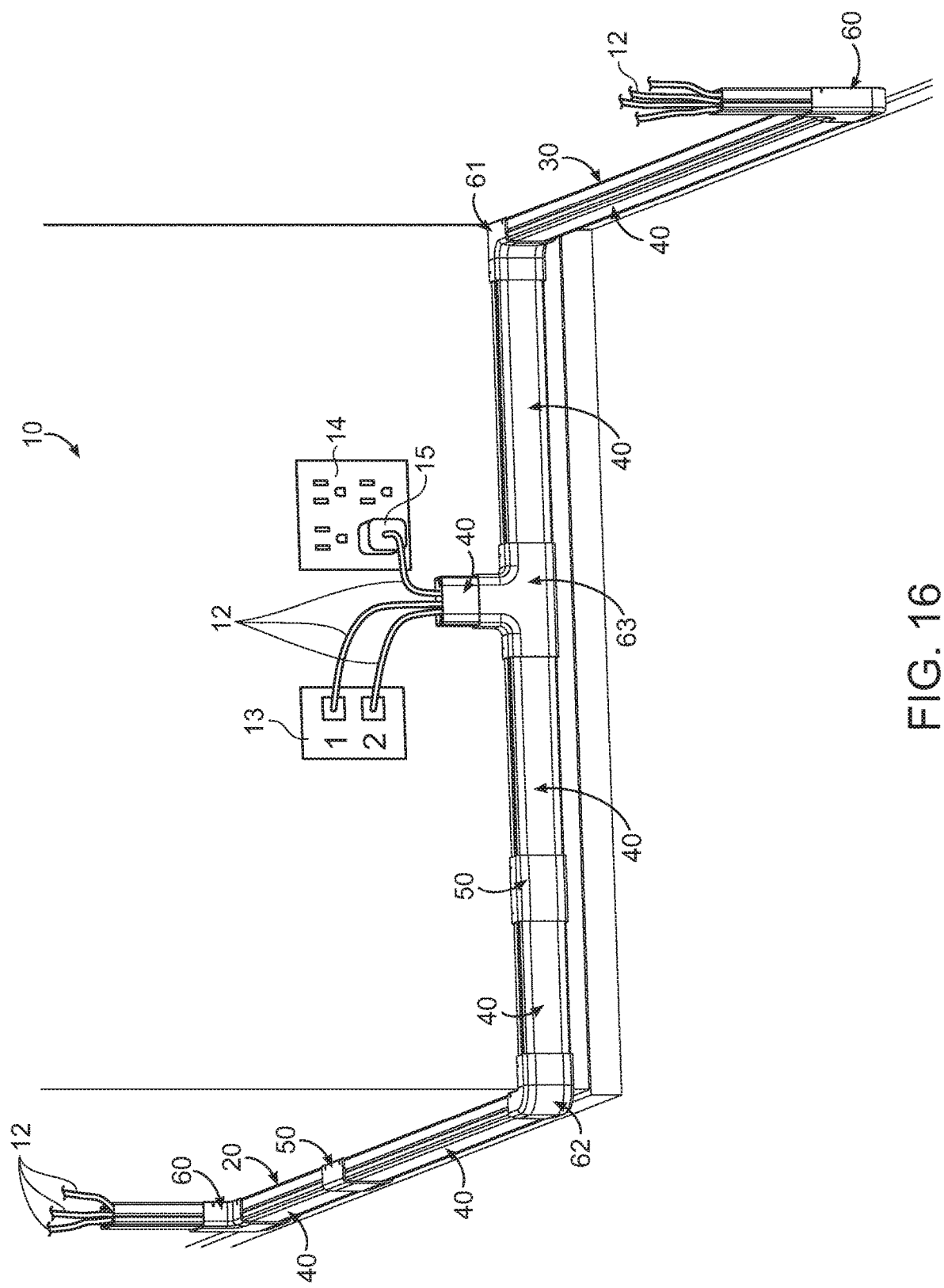
FIG. 16 is a perspective view of an installed conduit routing system in accordance with an example embodiment.

FIG. 16 illustrates an exemplary conduit routing system 10 which utilizes multiple channel members 20 and covers 40 which are interconnected by a plurality of different couplers 50, 60, 61, 62, 63, including flat elbow couplers 60, an inside elbow coupler 61, an outside elbow coupler 62 and a three-way coupler 63. Conduits 12 are shown exiting the channel member 40; with two conduits 12 being connected to an Ethernet outlet 13 and one conduit 12 being connected to a power outlet 14 by a power connector 15.

It should be appreciated that the methods and systems described herein may be utilized in connection with a wide range of conduits 12 comprising elongated members for transferring various materials, including wires, cables, piping, cords, and the like. The conduits 12 could be utilized for transferring fluids (such as water or hydraulics), electricity, or solids (such as particulate materials). The methods and systems described herein should not be construed as limited to any particular conduit 12, as the channel member 20 may be configured to receive and secure any number of types of elongated members for transferring various materials.

B. Channel Member.

Figure 2:
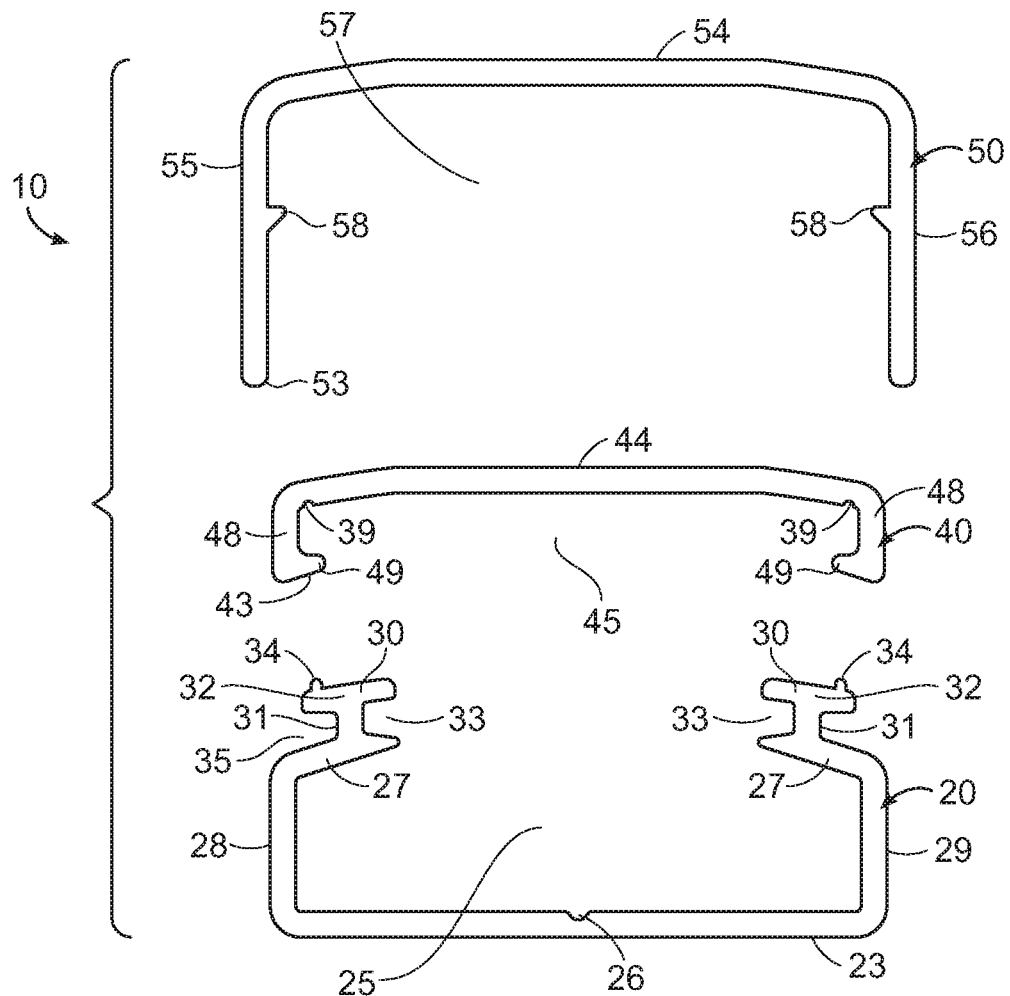
FIG. 2 is an exploded end view of a conduit routing system in accordance with an example embodiment.
Figure 3:
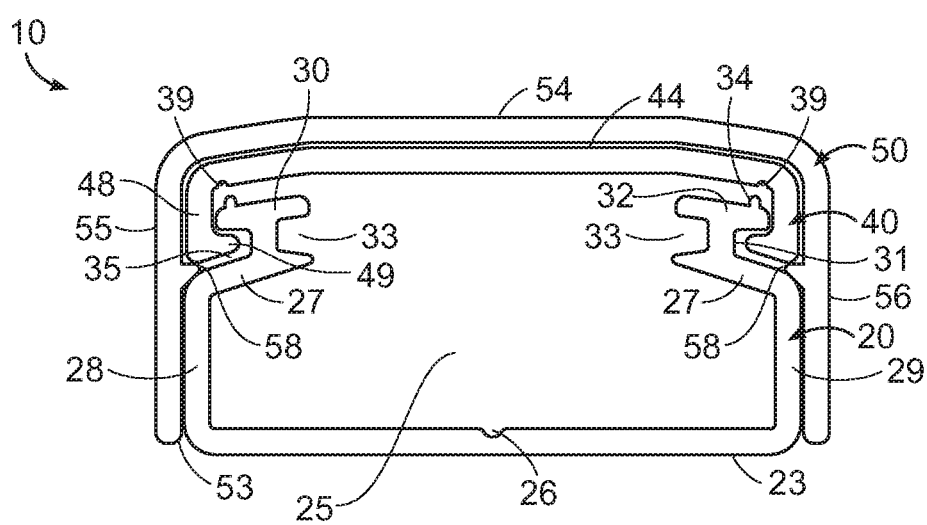
FIG. 3 is an end view of a conduit routing system in accordance with an example embodiment.
Figure 4:
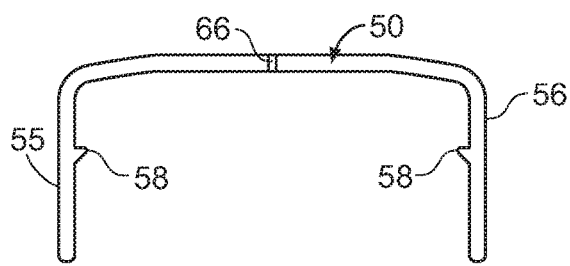
FIG. 4 is an end view of a cover of a conduit routing system in accordance with an example embodiment.
Figure 5:
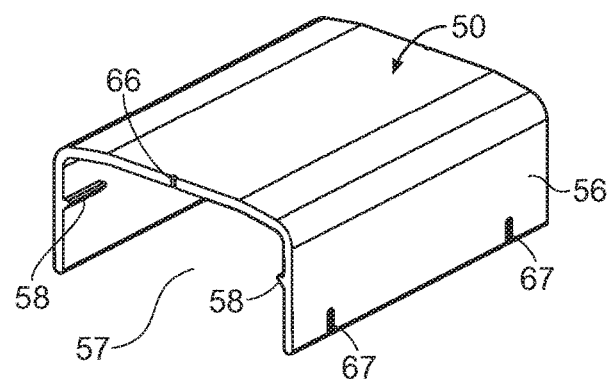
FIG. 5 is a perspective view of a straight coupler of a conduit routing system in accordance with an example embodiment.
Figure 6:
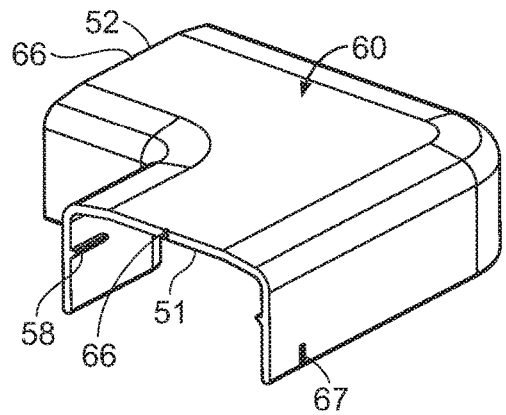
FIG. 6 is a perspective view of a flat elbow coupler of a conduit routing system in accordance with an example embodiment.
Figure 7:
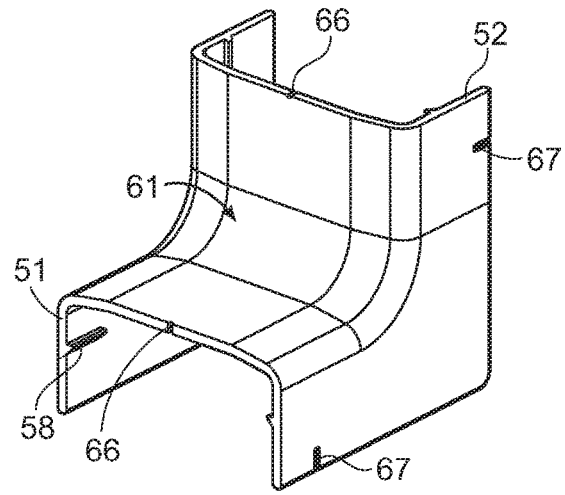
FIG. 7 is a perspective view of an inside elbow coupler of a conduit routing system in accordance with an example embodiment.
Figure 8:
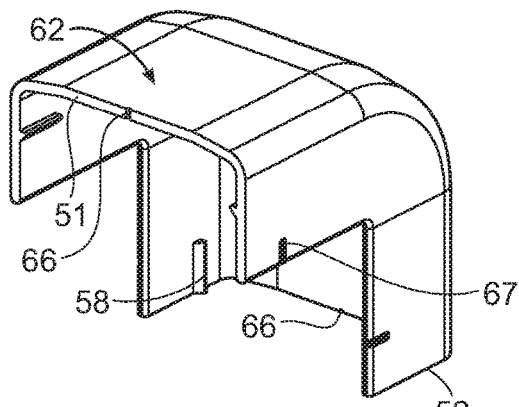
FIG. 8 is a perspective view of an outside elbow coupler of a conduit routing system in accordance with an example embodiment.
Figure 9:
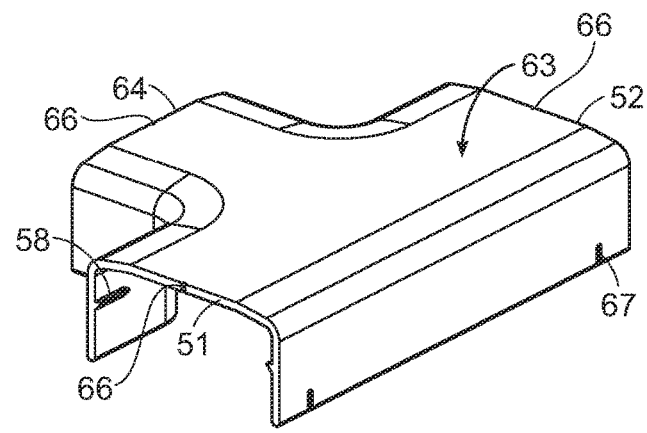
FIG. 9 is a perspective view of a three-way coupler of a conduit routing system in accordance with an example embodiment.
Figure 10:
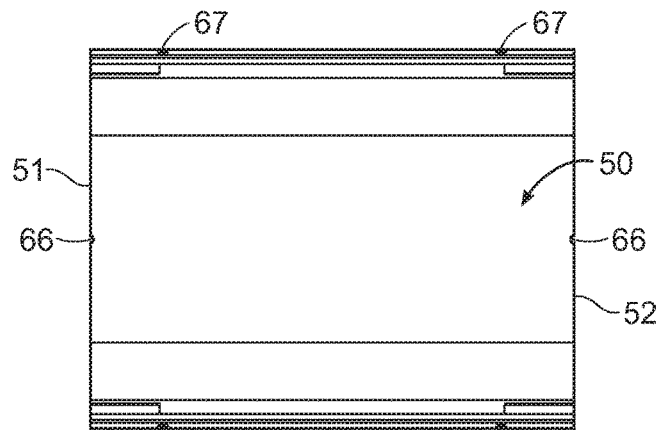
FIG. 10 is a top view of a straight coupler of a conduit routing system in accordance with an example embodiment.
Figure 11:
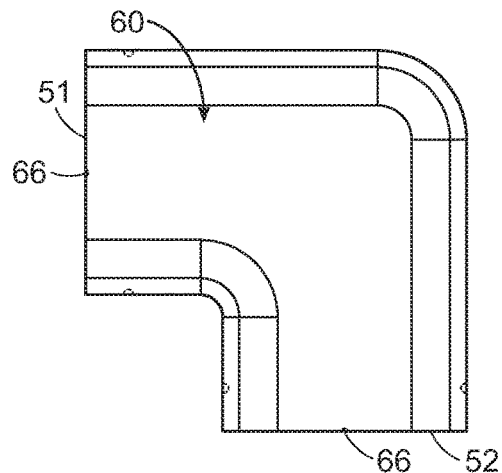
FIG. 11 is a top view of a flat elbow coupler of a conduit routing system in accordance with an example embodiment.
Figure 12:
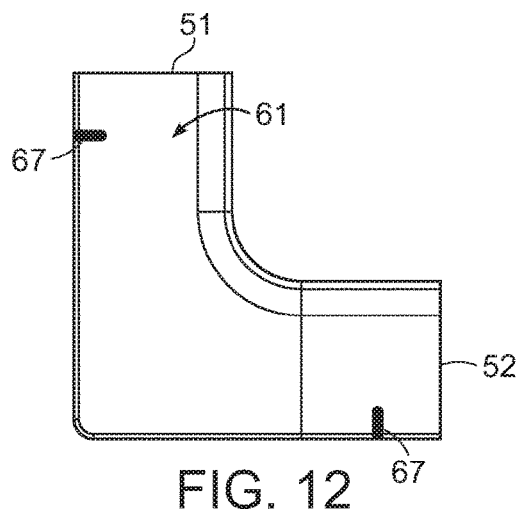
FIG. 12 is a top view of an inside elbow coupler of a conduit routing system in accordance with an example embodiment.
Figure 13:
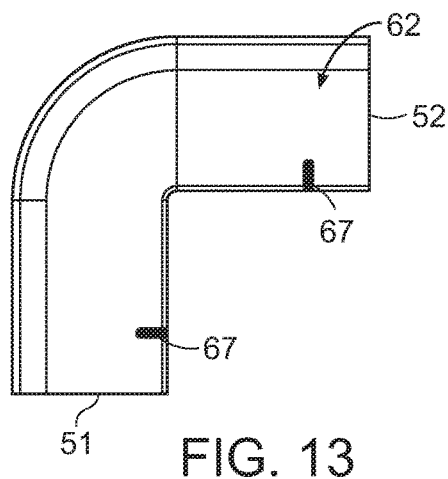
FIG. 13 is a top view of an outside elbow coupler of a conduit routing system in accordance with an example embodiment.
Figure 14:
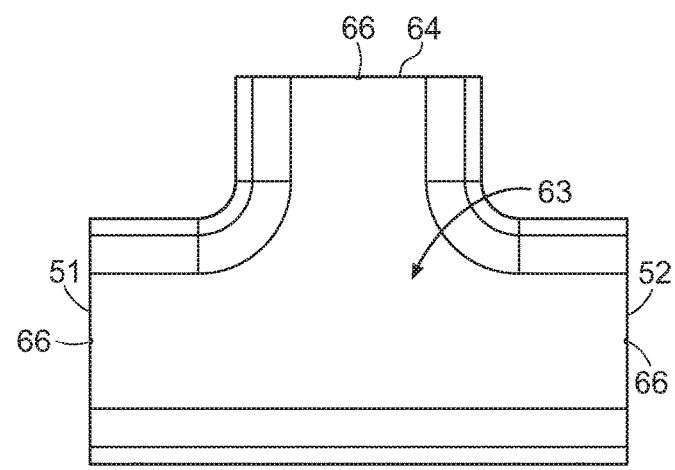
FIG. 14 is a top view of a three-way coupler of a conduit routing system in accordance with an example embodiment.

As best shown in FIGS. 1-3, an exemplary embodiment of the conduit routing system 10 may include a channel member 20 which is adapted to be secured against a structure 16 such as a wall or the like. The channel member 20 may comprise a first end 21, a second end 22, a base 23, and an outer end 24. As shown in FIG. 1, the channel member 20 may also comprise a pair of sidewalls 28, 29; with a first sidewall 28 extending upwardly from a first side of the base 23 and a second sidewall 29 extending upwardly from a second side of the base 23.

The base 23 and sidewalls 28, 29 of the channel member 20 may comprise a U-shape as shown in the figures. However, various other shapes and configurations may be utilized. Additionally, the length and width of the channel member 20 may vary in different embodiments. The channel member 20 may be easily cut to length, so that a longer length of the channel member 20 may be initially acquired and then cut-to-length when installing.

As shown in FIGS. 16, 18, and 22-24, the base 23 of the channel member 20 will generally be connected to the structure 16, such as by anchors 18, fasteners 19 (nails, screws, etc.), adhesives (such as double-sided tape) or the like. By way of example and without limitation, methods of connected the channel member 20 to the structure 16 may include double-sided tape between the base 23 and the structure 16, anchors 18 in the structure 16 which are secured to via fasteners 19, fasteners 19 directly connected to the structure 16, or various combinations thereof.

Figure 17:
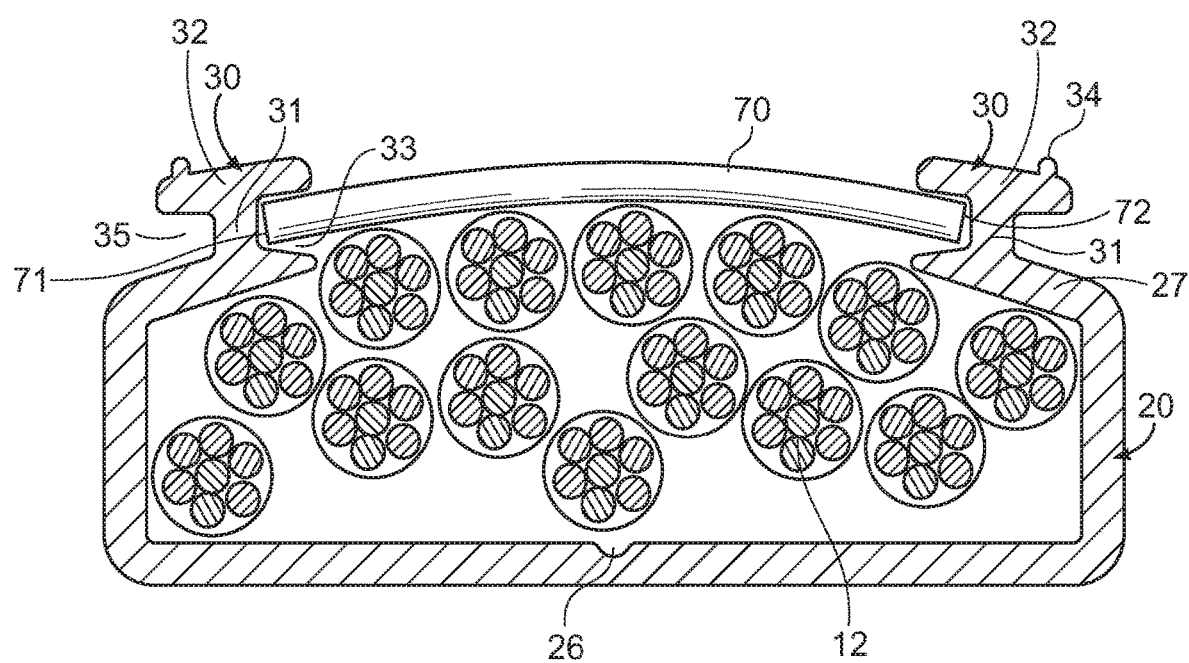
FIG. 17 is an end sectional view of a conduit routing system without a cover in accordance with an example embodiment.

Each of the sidewalls 28, 29 of the channel member 20 may include a connector 30 adapted to engage with a cover 40 which may be removably connected to the channel member 20. The channel member 20 may comprise a channel 25 which extends from the first end 21 to the second end 22 of the channel member 20; the channel 25 being defined between the base 23 and sidewalls 28, 29 of the channel member 20. The channel 25 may be adapted to receive and secure one or more conduits 12 such as shown in FIG. 17.

As shown in FIG. 1, the base 23 of the channel member 20 will generally comprise a flat, elongated member; with the first sidewall 28 extending outwardly from the first side of the inner end 23 and the second sidewall 28 extending outwardly from the second side of the inner end 23. Although the sidewalls 28, 29 are illustrated as extending at a right angle with respect to the inner end 23 of the channel member 20, it should be appreciated that the sidewalls 28, 29 could extend at other angles in other embodiments.

As shown in FIGS. 1 and 2, each of the sidewalls 28, 29 may include a flange 27 extending inwardly toward the channel 25 which partially closes off the top of the channel 25. The first sidewall 28 may comprise a first flange 27 and the second sidewall 29 may comprise a second flange 27. The flanges 27 may extend at different angles with respect to the sidewalls 28, 29, and thus the exemplary configuration shown in the figures should not be construed as limiting in scope. In some embodiments, the flanges 27 may extend at a right angle with respect to their respective sidewalls 28, 29.

As best shown in FIG. 1, the base 23 may include a groove 26 extending between the first end 21 and the second end 22 of the channel member 20. The groove 26 may be formed in the base 23 within the channel 25 of the channel member 20. The groove 26 may be positioned at the mid-point between the sidewalls 28, 29 of the channel member 20 as shown in the figures, or at other positions. The groove 26 may be utilized to line up the channel member 20 with markings 17 on the structure 16 such as center-line markings 17. The groove 26 on the channel member 20 may be utilized for aligning with wall studs that have been located, measured, and marked with markings 17 prior to positioning the channel member 20 against the structure 16.

The groove 26 may perform a number of functions for the conduit routing system 10. First, the groove 26 may assist with accurately positioning and fastening the channel member 20 based on a center-line marking 17 drawn on the structure 16 to which the channel member 20 is being secured. Second, the groove 26 may assist an operator with identifying the location of drywall anchors without having to pre-drill holes in the channel member 20. Finally, when securing the channel member 20 against a structure, the groove 26 may provide a "catch point" for the tip of the fastener 19 (such as while being installed with a tool as shown in FIG. 23B) at the center of the channel member 20 without the need for measuring and drilling a pilot hole.

As best shown in FIGS. 2-3, the channel member 20 may include connectors 30 which assist with connecting a cover 40 to the channel member 20. The connectors 30 also may be utilized to connect a securing member 70 across the channel 25 to secure the conduits 12 within the channel 20. The connectors 30 also may be utilized to support connector strips 74 such as adhesive tape between the channel member 20 and the cover 40 to prevent the cover 40 from slumping due to gravity in vertically-oriented sections of the mounted channel member 20.

As best shown in FIG. 2, the connectors 30 may comprise elongated T-shaped members which extend for the length of the channel member 20. As shown in the figures, a first connector 30 may be positioned on the first sidewall 28 and a second connector 30 may be positioned on the second sidewall 29. More specifically and as shown in FIG. 2, a first connector 30 may extend from the flange 27 of the first sidewall 28 and a second connector 30 may extend from the flange 27 of the second sidewall 29.

Each connector 30 may comprise an elongated rib 31 comprising a vertical (or substantially vertical) raised portion extending upwardly from the flange 27 on either side of the channel member 20. As shown in FIG. 2, a flange portion 32 is positioned at the upper end of the rib 31 to form a T-shape. As best shown in FIG. 2, the flange 27 of the channel member 20 may extend slightly more into the channel 25 than the flange portion 32 of the connector 30.

As shown in FIG. 2, each connector 30 may comprise an inner receiver slot 33 and an outer receiver slot 35. Each of the receiver slots 33, 35 may be defined between the flange 27 of the channel member 20, the flange portion of the connector 30, and the rib 31 of the connector 30. The inner receiver slots 33 may be utilized to secure and engage with a securing member 70 which may extend across the channel 25 between the connectors 30 to secure the conduits 12 within the channel 25. The outer receiver slots 35 may be utilized to engage with cover connectors 49 to connect the cover 40 to the channel member 20 as discussed herein.

Each connector 30 may comprise a projection 34 which may serve as a guide for placement of connector strips 74 in combination with cover grooves 39 on the cover 40. As best shown in FIG. 17, a projection 34 may extend upwardly from the flange portion 32 of each connector 30. Corresponding cover grooves 39 may be positioned on the underside of the cover 40. The projections 34 of the connector 30 and cover grooves 39 of the cover 40 may act as guides for placement of the connector strips 74.

C. Cover.

As shown in FIGS. 2-3, a cover 40 may be removably connected to the channel member 20 so as to cover the channel 25 and conceal the conduits 12 secured therein. The cover 40 may comprise a first end 41, a second end 42, an inner end 43, and an outer end 44. A channel 45 may extend through the cover 40; the channel 45 being defined between a first side 46 and second side 47 of the cover 40. The channel 45 may be utilized to provide room to accommodate a securing member 70 which may be connected between the sidewalls 28, 29 of the channel member 20 and may bow out slightly into the channel 45 of the cover 40 such as shown in FIG. 17.

The length and width of the cover 40 may vary in different embodiments or for different applications. The cover 40 may be cut-to-length in some embodiments. The inner end 43 of the cover 40 is generally connected to the channel member 20 by the connectors 30 of the channel member 20; with the cover connectors 49 of the cover 40 engaging within the outer receiver slots 35 of the connectors 30 such as shown in FIG. 3. The cover 40 will preferably extend between the sidewalls 28, 29 of the channel member 20 so as to enclose the channel 25 of the channel member 20.

As shown in FIG. 2, the cover 40 may comprise a pair of flanges 48, with a first flange 48 at its first side 46 and a second flange 49 at its second side 47. Each flange 48 may include a cover connector 49 adapted to engage with the outer receiver slots 35 of the connectors 30 of the channel member 20 to secure the cover 40 to the channel member 20. Various configurations may be utilized. In the exemplary embodiment shown in FIG. 2, each cover connector 49 is illustrated as comprising an inwardly-extending (toward the channel 45) rib or elongated projection. As shown in FIG. 2, a first cover connector 49 may extend inwardly from the distal end of the first flange 48 and a second cover connector 49 may extend inwardly from the distal end of the second flange 48.

As shown in FIG. 2, the cover 40 may comprise cover grooves 39 which, in conjunction with the projections 34 on the connector 30, may serve as a guide for placement of connector strips 74 between the cover 40 and connector 30. As shown in the figures, the cover grooves 39 may extend for the length of the cover 40 within its channel 45. The cover grooves 39 may be positioned at the intersection between the outer end 44 of the cover 40 and its flanges 48.

D. Couplers.

As shown throughout the figures, couplers 50, 60, 61, 62, 63 may be utilized to interconnect multiple lengths of channel members 20 and secured covers 40 to form the conduit routing system 10. A wide range of couplers 50, 60, 61, 62, 63 may be utilized. It should be appreciated that the following listing of exemplary types of couplers 50, 60, 61, 62, 63 is in no way exhaustive, and should not be construed as limiting in scope.

A straight coupler 50 may be utilized to couple two linear lengths of channel members 20 and covers 40 such as shown in FIG. 16. A flat elbow coupler 60 may be utilized to couple non-linear channel members 20 and covers 40 together, such as when turning a corner along a flat surface such as shown in FIG. 16.

An inside elbow coupler 61 may be utilized to couple lengths of channel members 20 and covers 40 extending around an outwardly-facing corner such as shown in FIG. 16. An outside elbow coupler 62 may be utilized to couple lengths of channel members 20 and covers 40 extending around an inwardly-facing corner such as shown in FIG. 16. A three-way coupler 63 may be utilized to coupler three lengths of channel members 20 and covers 40 such as shown in FIG. 16. Various other types of couplers may be utilized to suit different applications and routing pathways in different embodiments.

As shown throughout the figures, each coupler 50, 60, 61, 62, 63 may comprise a first end 51, a second end 52, an inner end 53, an outer end 54, a first side 55, and a second side 56. A channel 57 may extend through the coupler 50, 60, 61, 62, 63; the channel 57 being defined between the outer end 54, first side 55, and second side 56 of the coupler 50, 60, 61, 62, 63 such as shown in FIGS. 4-8. In a three-way coupler 63, a third end 64 may also be included.

The inner end 53 of the coupler 50, 60, 61, 62, 63 may be connected over the channel member 20 and cover 40; with the outer end 54 facing outwardly. The first side 55 of the coupler 50, 60, 61, 62, 63 may fit over the first sidewall 28 of the channel member 20 and the first side 46 of the cover 40. The second side 56 of the coupler 50, 60, 61, 62, 63 may fit over the second sidewall 29 of the channel member 20 and the second side 47 of the cover 40.

As shown in FIG. 3, the coupler 50, 60, 61, 62, 63 may be installed over the cover 40 and channel member 20; with the cover 40 and channel member 20 being positioned within the channel 57 of the coupler 50, 60, 61, 62, 63. Within the channel 57 of the coupler 50, 60, 61, 62, 63, a pair of coupler connectors 58 may extend inwardly from the first side 55 and second side 56 of the coupler 50, 60, 61, 62, 63 such as shown in FIG. 2.

The coupler connectors 58 may comprise elongated projections or ribs. The figures illustrate that the coupler connectors 58 do not extend for the full length of the coupler 50, 60, 61, 62, 63. It should be appreciated that, in some embodiments, the coupler connectors 58 may extend for the full length. The coupler connectors 58 may be adapted to engage between the cover 40 and channel member 20 such as shown in FIG. 3 to secure the coupler 50, 60, 61, 62, 63 over the channel member 20 and cover 40.

The couplers 50, 60, 61, 62, 63 may be utilized to interconnect two or more length of channel member 20 and covers 40 together, including around corners and the like. FIG. 16 illustrates a number of different types of couplers, including a straight coupler 50, a flat elbow coupler 60, an inside elbow coupler 61, an outside elbow coupler 62, and a three-way coupler 63. Other types of couplers could be utilized in different embodiments.

Figure 25A:
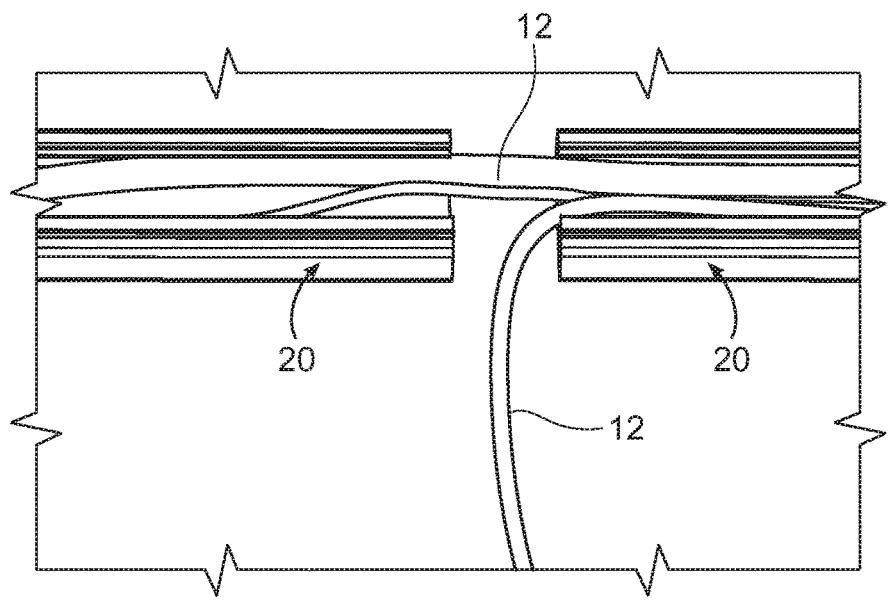
FIG. 25A is a perspective view illustrating a pair of spaced-apart channel members of a conduit routing system in accordance with an example embodiment.
Figure 25B:
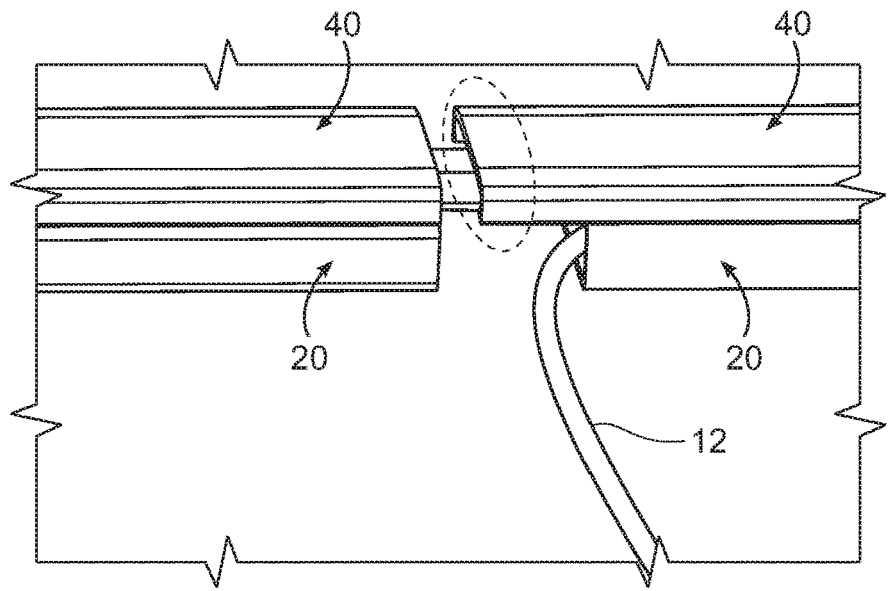
FIG. 25B is a perspective view illustrating covers installed on a pair of spaced-apart channel members of a conduit routing system in accordance with an example embodiment.
Figure 25C:
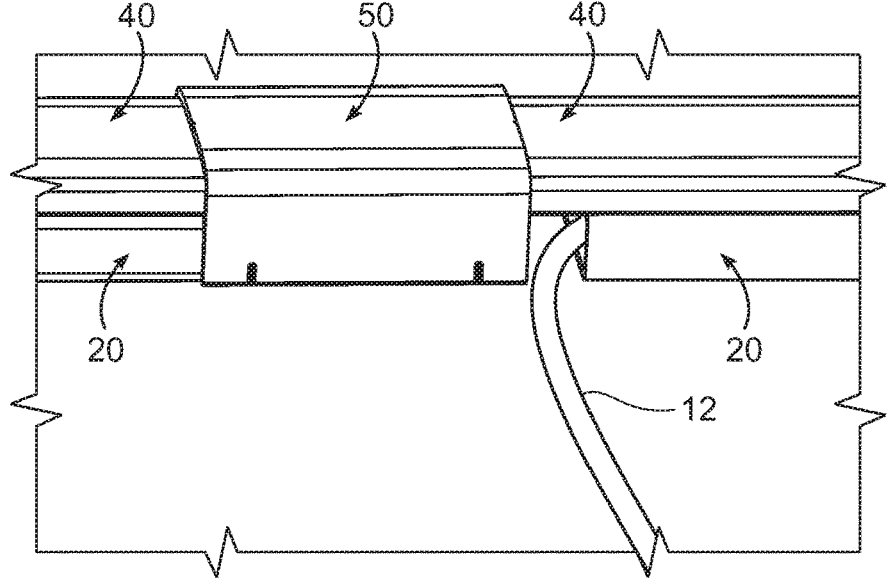
FIG. 25C is a perspective view illustrating a coupler linking a pair of spaced-apart channel members and covers of a conduit routing system in accordance with an example embodiment.

FIG. 16 illustrates a straight coupler 50 being used to interconnect a pair of sections of channel member 20. As shown in FIGS. 25A, 25B, and 25C, couplers 50, 60, 61, 62, 63 may also be utilized to allow a single conduit 12 to exit from the channel members 20 while remaining conduits 12 are routed through the channel members 20. Generally, a coupler 50, 60, 61, 62, 63 will extend between the second end 22 of a first channel member 20 and the first end 21 of a second channel member 20 to connect the two channel members 20 together. A three-way coupler 63 may be utilized to couple three lengths of channel members 20 together.

Figure 24A:
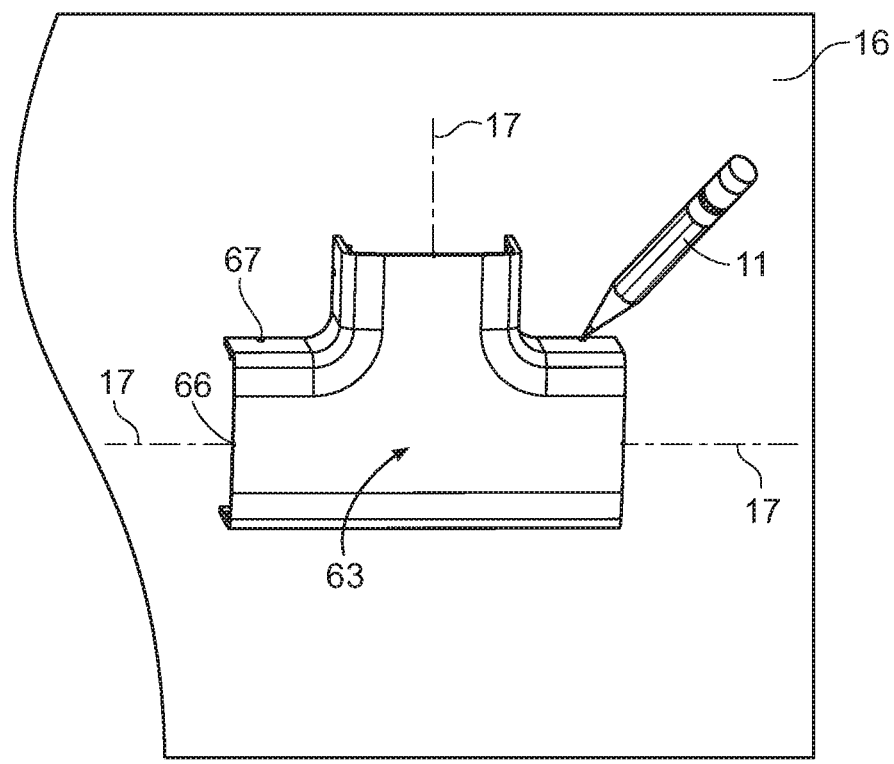
FIG. 24A is a frontal view illustrating marking of a structure prior to installation of a coupler of a conduit routing system in accordance with an example embodiment.
Figure 24B:
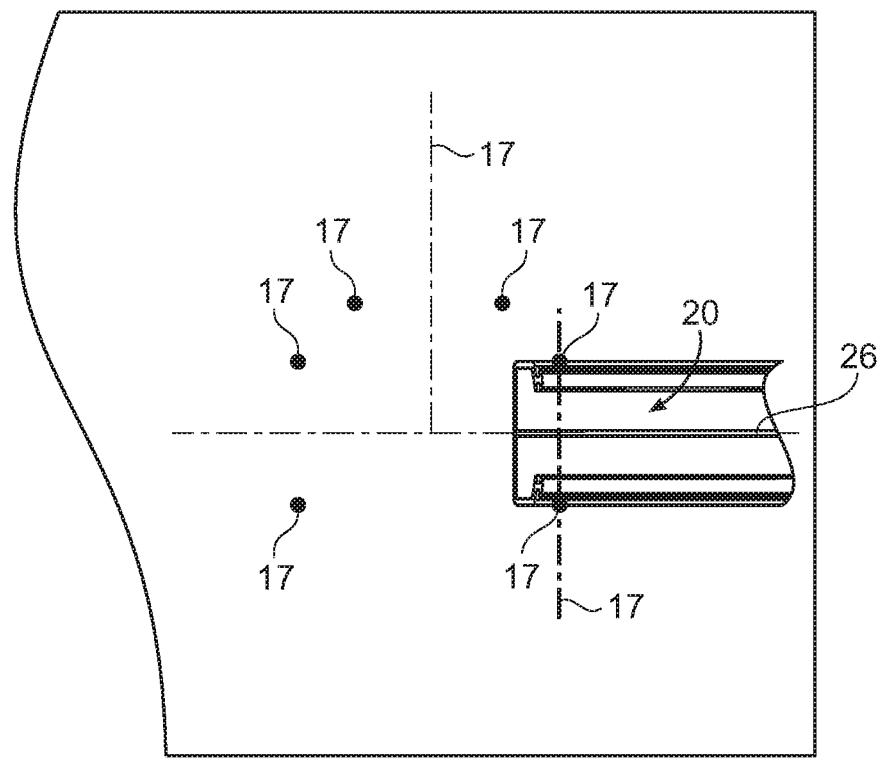
FIG. 24B is a frontal view illustrating positioning of a channel member of a conduit routing system in accordance with an example embodiment.

As shown in FIGS. 24A and 24B, the couplers 50, 60, 61, 62, 63 may include positioning notches 66, 67 which assist with positioning the couplers 50, 60, 61, 62, 63 and cutting the channel members 20 to the proper length as discussed below. As shown in FIGS. 5-9, centerline positioning notches 66 may be located at the respective ends 51, 52 of the coupler 50, 60, 61, 62, 63 at its center-line to aid with alignment, positioning, and the like. Additional edge locator positioning notches 67 may be located on the sides 55, 56 of the coupler 50, 60, 61, 62, 63 offset from the ends 51, 52 of the couplers to aid in locating where the channel member 20 edges should fall (or be cut) during the layout stage of installation.

E. Securing Members and Connector Strips.

Figure 15:
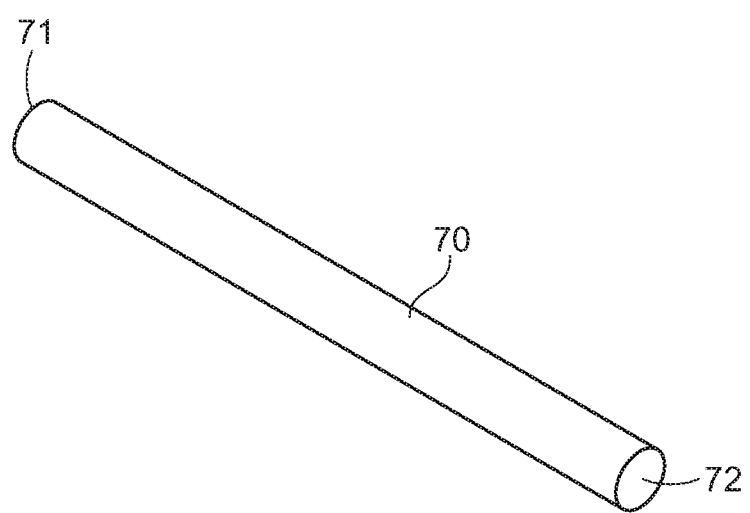
FIG. 15 is a perspective view of a securing member of a conduit routing system in accordance with an example embodiment.

As best shown in FIGS. 17, 18A, 18B, and 18C, securing members 70 may be utilized to secure and retain the conduits 12 within the channel 25 of the channel member 20. FIG. 15 illustrates an exemplary securing member 70 comprised of an elongated, resilient member having a first end 71 and a second end 72. The shape, size, and configuration of the securing member 70 may vary in different embodiments. The securing member 70 may comprise a tie-rod configuration as shown in the figures.

Each securing member 70 may be connected between the first connector 30 and the second connector 30 of a channel member 30 so as to enclose the channel 25 of the channel member 20 such as shown in FIG. 17. More specifically, the first end 71 of the securing member 70 may fit within and engage with the first inner receiver slot 33 of a first connector 30 on a first sidewall 28 of a channel member 20 and the second end 72 of the securing member 70 may fit within and engage with the second inner receiver slot 33 of a second connector 30 on a second sidewall 29 of a channel member 20. In this manner, the conduits 12 may be secured within the channel 20 such as shown in FIG. 17. In some embodiments, the securing member 70 may bow out slightly into the channel 45 of the cover 40.

Connector strips 74 may also be utilized to effectuate a firm connection between the cover 40 and the channel member 20 such as shown in FIGS. 19-21. Various types of connector strips 74 may be utilized, such as but not limited to double-sided tape. The connector strips 74 may have a strip cover 75 which is removed just prior to use. The connector strips 74 may be particularly useful for preventing slumping of the cover 40 from the channel member 20 on vertical sections due to force of gravity, which is a common shortcoming of raceway systems.

Figure 20A:
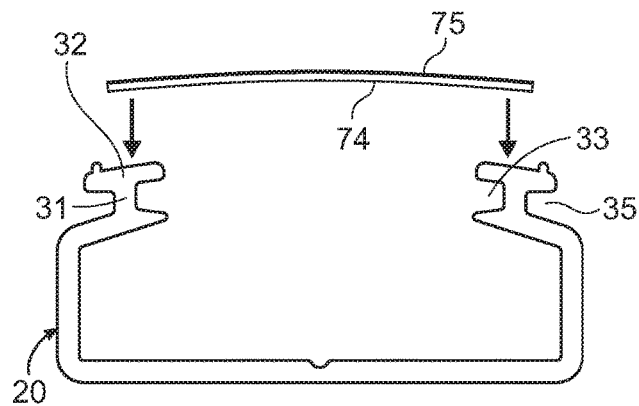
FIG. 20A is an end view illustrating installation of a connector strip to a channel member of a conduit routing system in accordance with an example embodiment.
Figure 21A:
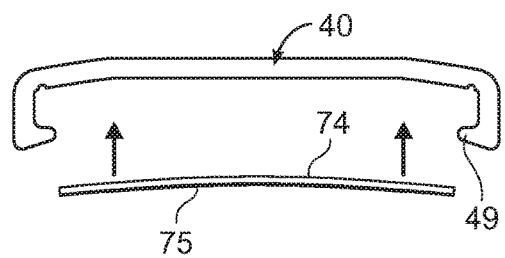
FIG. 21A is an end view illustrating installation of a connector strip to a cover of a conduit routing system in accordance with an example embodiment.
Figure 20B:
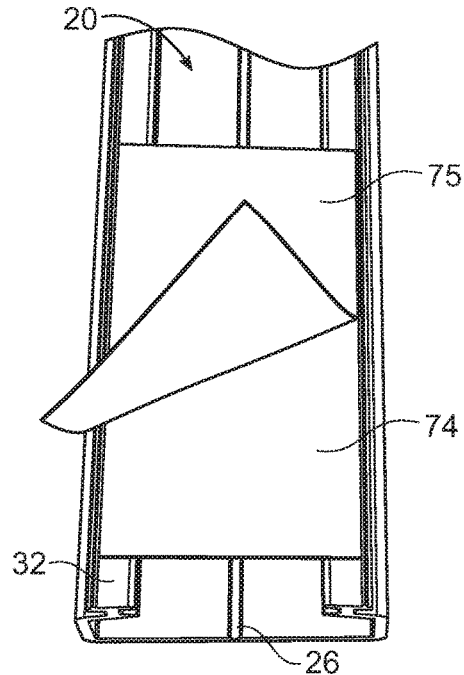
FIG. 20B is a top view illustrating installation of a connector strip to a channel member of a conduit routing system in accordance with an example embodiment.
Figure 21B:
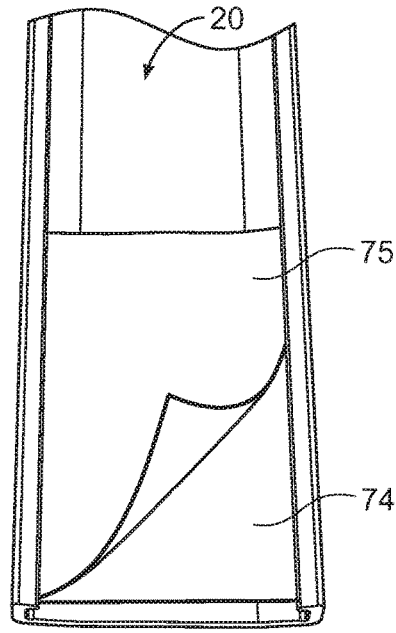
FIG. 21B is a bottom view illustrating installation of a connector strip to a cover of a conduit routing system in accordance with an example embodiment.

In an embodiment shown in FIGS. 20 and 21, a single connector strip 74 may be wide enough to extend between the first connector 30 and second connector 30 of a channel member 20. As shown in FIGS. 20A and 20B, a single connector strip 74 could be secured to the flange portions 32 of a pair of opposed connectors 30 of a channel member 20 so as to extend across the channel 25. As shown in FIGS. 21A and 21B, a single connector strip 74 could alternatively or additionally be secured to the flanges 48 of the cover 40 so as to extend across the cover's 40 channel 45. In either case, the connector strip 74 will provide a firm connection between the channel member 20 and cover 40.

Figure 19A:
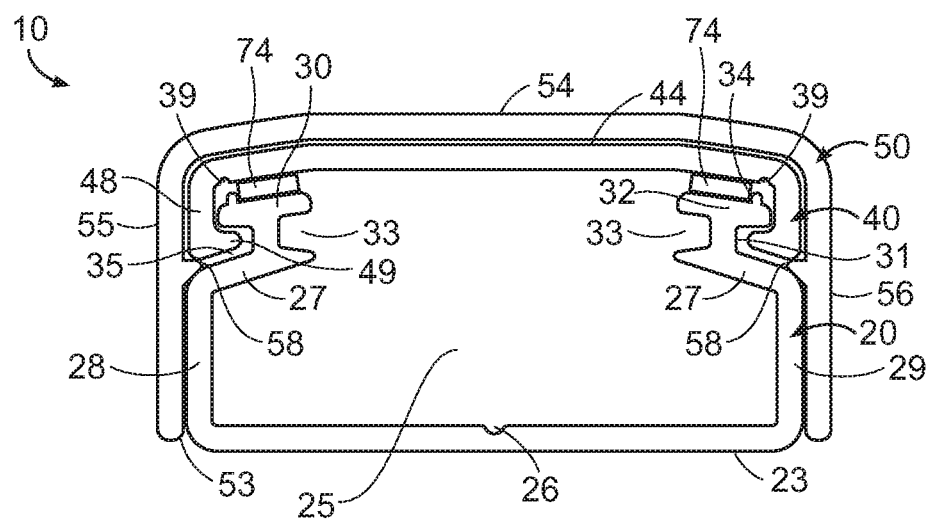
FIG. 19A is an end view of connector strips being used to secure a conduit routing system in accordance with an example embodiment.

In an embodiment shown in FIG. 19, multiple connector strips 74 may be utilized. In such an embodiment, a first connector strip 74 may be positioned along the flange portion 32 of a first connector 30 and a second connector strip 74 may be positioned along the flange portion 32 of a second connector 30. These connector strips 30 engage with the cover 40 to secure the channel member 20 to the cover 40 such as shown in FIG. 19A. This configuration may be preferable when a securing member 70 is being used.

F. Operation of Preferred Embodiment.

The method of installing the conduit routing system 10 may vary widely among different embodiments and to suit different applications. Different areas and locations, or different types of hardware, will necessarily require variations in the installation of the conduit routing system 10. What follows are merely illustrative examples of exemplary embodiments of methods for installing and using the conduit routing system 10.

Broadly speaking, the channel member 20 may first be secured to a structure 16 such as a wall, the floor, the ceiling, or the like. One or more channel members 20 may be secured against the structure 16 in the path to be taken by one or more conduits 12, such as from a powered device to a power outlet 14 or from a communications device to an Ethernet outlet 13. The manner in which each channel member 20 is secured to the wall may vary, such as by using anchors 18 and/or fasteners 19 as shown in the figures.

With the channel member(s) 20 secured to the structure 16, the conduits 12 may be routed along the desired path by running the conduits 12 through the channel 25 of the channel member(s) 20. Gaps between channel members 20 may be provided to accommodate different couplers 50, 60, 61, 62, 63 if necessary as shown in FIG. 18 and described below.

Figure 18A:
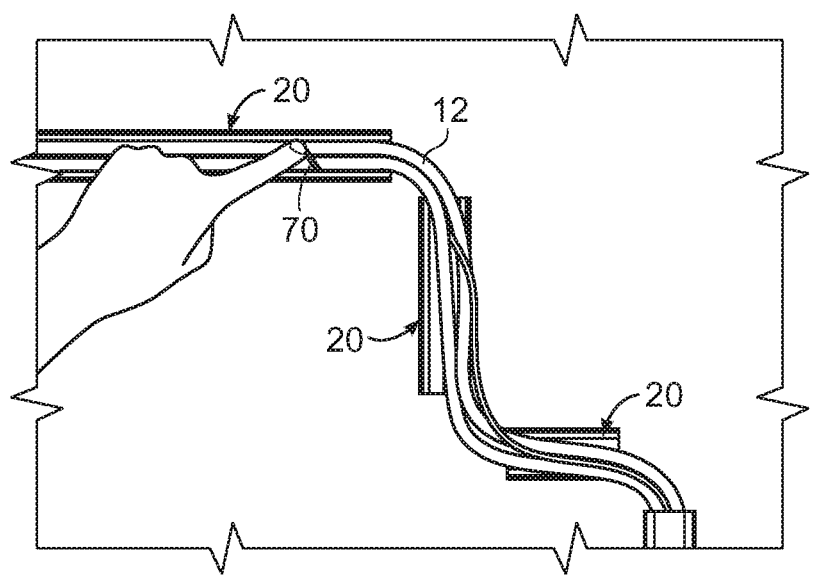
FIG. 18A is a frontal view illustrating conduits being secured within channel members by securing members of a conduit routing system in accordance with an example embodiment.
Figure 18B:
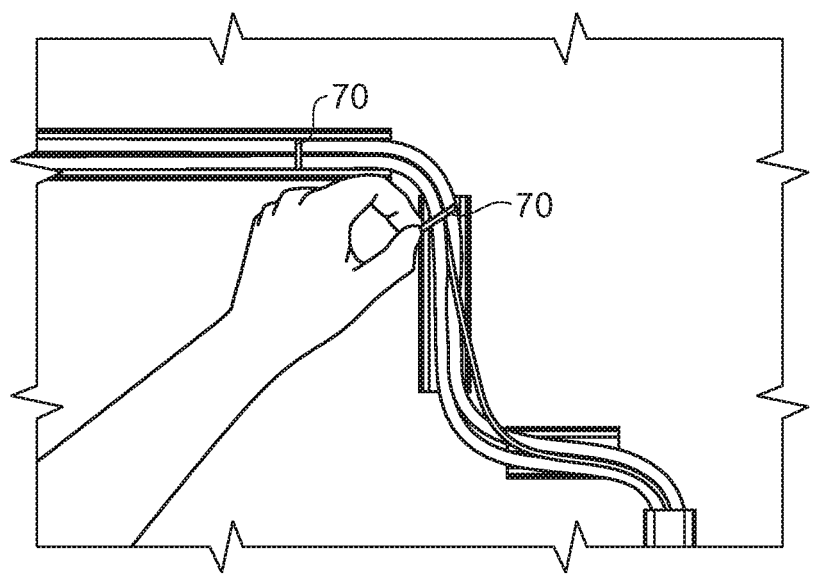
FIG. 18B is a frontal view illustrating conduits being secured within channel members by securing members of a conduit routing system in accordance with an example embodiment.
Figure 18C:
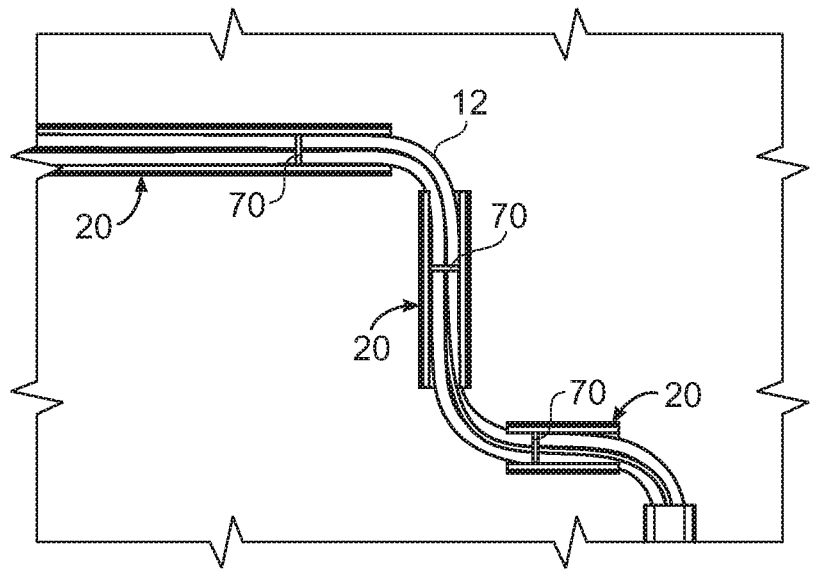
FIG. 18C is a frontal view illustrating conduits secured within channel members by securing members of a conduit routing system in accordance with an example embodiment.

It may be desirable in some embodiments to utilize securing members 70 to secure and retain the conduits 12 within the channel 25 of the channel member 20. FIGS. 18A, 18B, and 18C illustrate an exemplary method of securing such conduits 12 within a channel 25 using securing members 70. The securing members 70 may be cut-to-length as needed, and initially provided in a long, unitary structure.

As shown in FIG. 18A, to install the securing member 70, the securing member 70 may be inserted at its first end 71 into a first inner receiver slot 33 of a first connector 30 and at its second end 72 into a second inner receiver slot 33 of a second connector 30 of the same channel member 20. The securing member 70 may be inserted at an angle to ease the fit, and then turned to be perpendicular across the channel 25 as shown in FIGS. 18A and 18B between the first connector 30 and second connector 30.

Multiple securing members 70 may be utilized, with the spacing between and number of securing members 70 used for each channel member 20 varying in different embodiments. In some embodiments, securing members 70 may be omitted entirely. When securing members 70 are utilized, they will assist in holding the conduits 12 in place when installing the cover 40 and/or couplers 50, 60, 61, 62, 63 as shown in FIG. 18C.

With the securing members 70 retaining and securing the conduits 12 within the channel member 20, the cover 40 may be installed to enclose the channel 25 for a more appealing finish and to protect the conduits 12 therein. Broadly speaking, the cover 40 may be lowered onto the channel member 20 such that the cover connectors 49 engage with the connectors 30 of the channel member 20, such as by snapping into place.

More specifically and as shown in FIG. 3, the cover 40 may be lowered onto the channel member 20 such that the coupler connectors 58 are inserted into and engaged with the corresponding outer receiver slots 35 of the connectors 30 of the channel member 20. The engagement between the coupler connectors 58 and outer receiver slots 35 will removably connect the cover 40 to the channel member 20. The cover 40 may in some embodiments be bowered outwardly slightly to fit over the channel member 20 before snapping into place. The projection 34 on the flange portion 32 of each connector 30 and a corresponding cover groove 39 on the cover 40 may also guide positioning of a connector strip 74 between the connector 30 and cover 40.

In some embodiments, such as installations that require vertically-oriented channel members 20 and covers 40, it may be desirable to utilize one or more connector strips 74 to secure the cover 40 onto the channel member 20 and prevent slumping due to gravity.

Figure 19B:
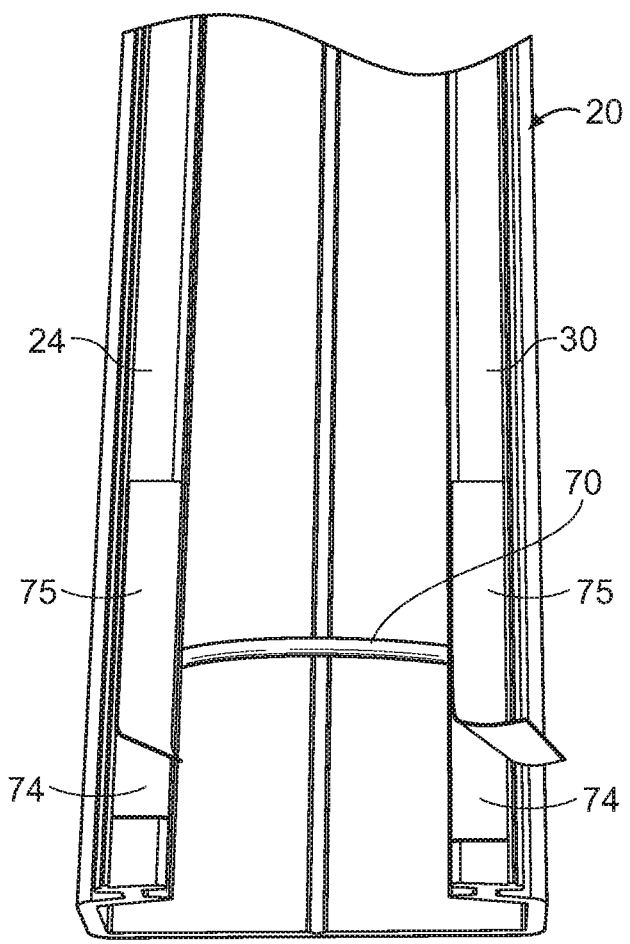
FIG. 19B is a top view illustrating installation of connector strips of a conduit routing system in accordance with an example embodiment.

FIGS. 19-21 illustrate different methods of utilizing connector strips 74 to secure the connection between the cover 40 and channel member 20. FIGS. 19A and 19B illustrate an embodiment in which a first connector strip 74 is secured along the flange portion 32 of the first connector 30 and a second connector strip 74 is secured along the flange portion 32 of the second connector 30. The strip cover 75 may be removed and then the cover 40 lowered into place; with the connector strips 74 adhesively connected the connectors 30 of the channel member 20 to the cover 40.

FIGS. 20A and 20B illustrate use of a single, wider connector strip 74 which extends between the two flange portions 32 of the connectors 30 of a channel member 20 so as to extend across the channel 25. Alternatively, the connector strip 74 could be secured between the flanges 48 of the cover 40 so as to extend across the channel 45 of the cover 40 such as shown in FIGS. 21A and 21B. In either case, the connector strip 74 will adhesively secure the cover 40 to the channel member 20 to prevent slumping due to gravity or other conditions.

Different channel members 20 may be linked together by the use of couplers 50, 60, 61, 62, 63. Couplers 50, 60, 61, 62, 63 may be utilized to increase the effective length of the channel members 20 by linking them together, to turn around corners, or to make changes in direction such as going from horizontal to vertical to go up a wall. Broadly speaking and as shown in FIG. 3, the coupler 50, 60, 61, 62, 63 may be installed over the cover 40 and channel member 20; with the coupler connectors 58 of fitting between the sidewalls 28, 29 of the channel member 20 and the flanges 48 of the cover 40. Thus, the couplers 50, 60, 61, 62, 63 may be snapped into place over the cover 40 and channel member 20 after the cover 40 has been installed.

Figure 22A:
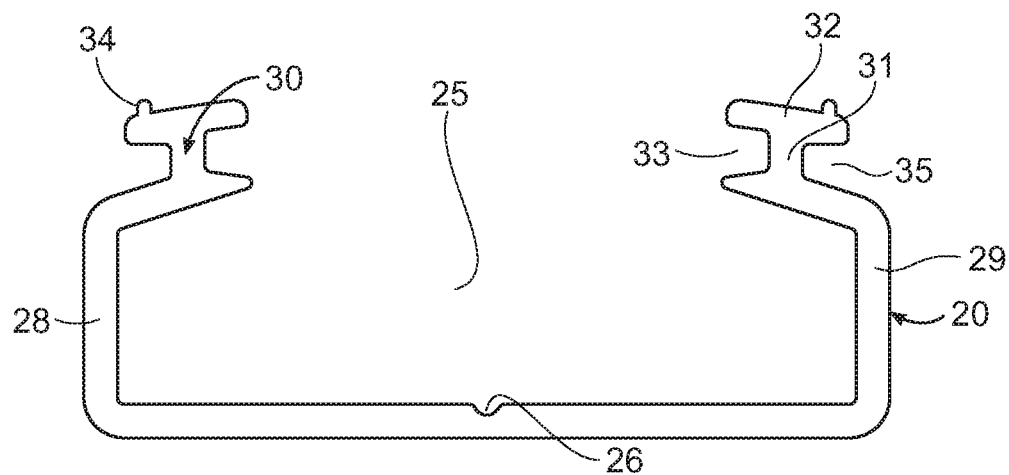
FIG. 22A is an end view of a channel member of a conduit routing system in accordance with an example embodiment.

As shown in FIGS. 22-24, markings 17 may be utilized to ease alignment and installation of the various components of the conduit routing system 10. For example, markings 17 may be made prior to positioning the channel member 20 against the structure 16 to mark the location of pre-measured or pre-located wall studs. Such wall stud markings 17 may be utilized in connection with the groove 26 on the channel member 20 for proper alignment and positioning of the channel member 20 with respect to studs in the structure 16.

Figure 22B:
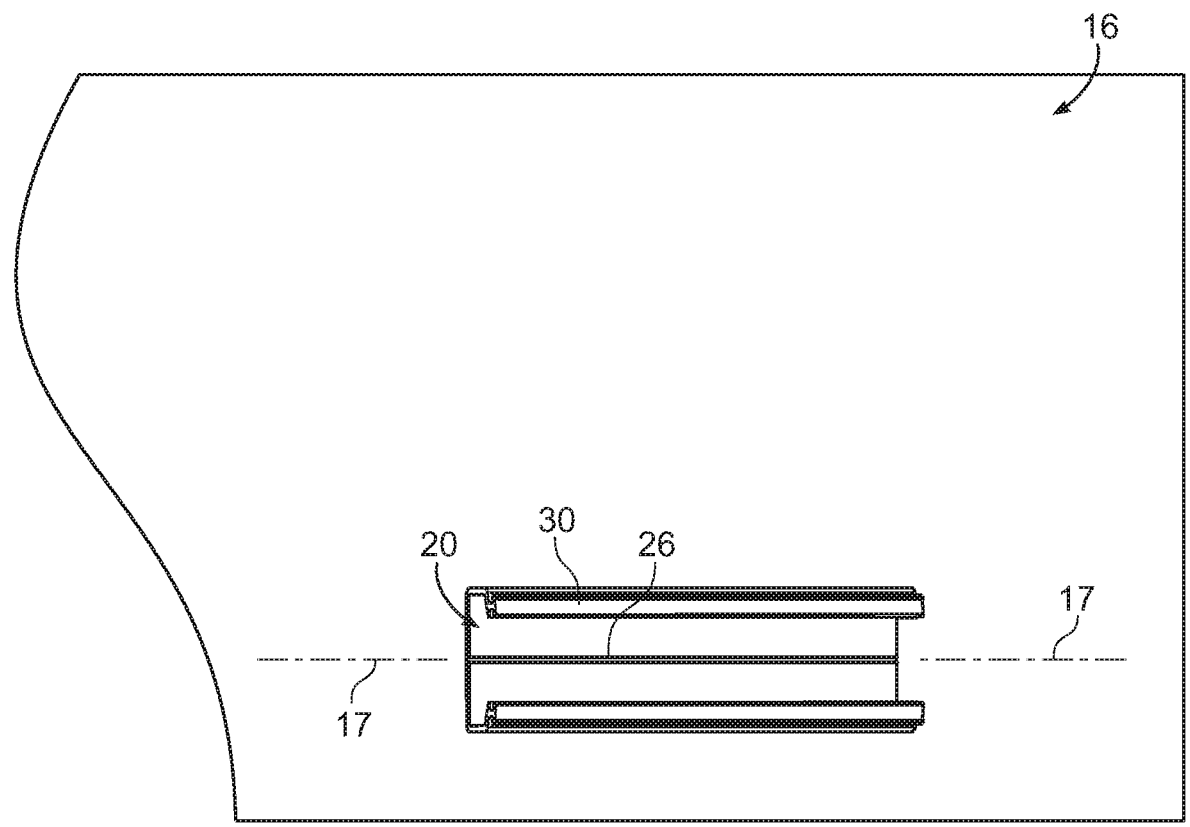
FIG. 22B is a frontal view illustrating installation of a channel member on a structure of a conduit routing system in accordance with an example embodiment.
Figure 23A:
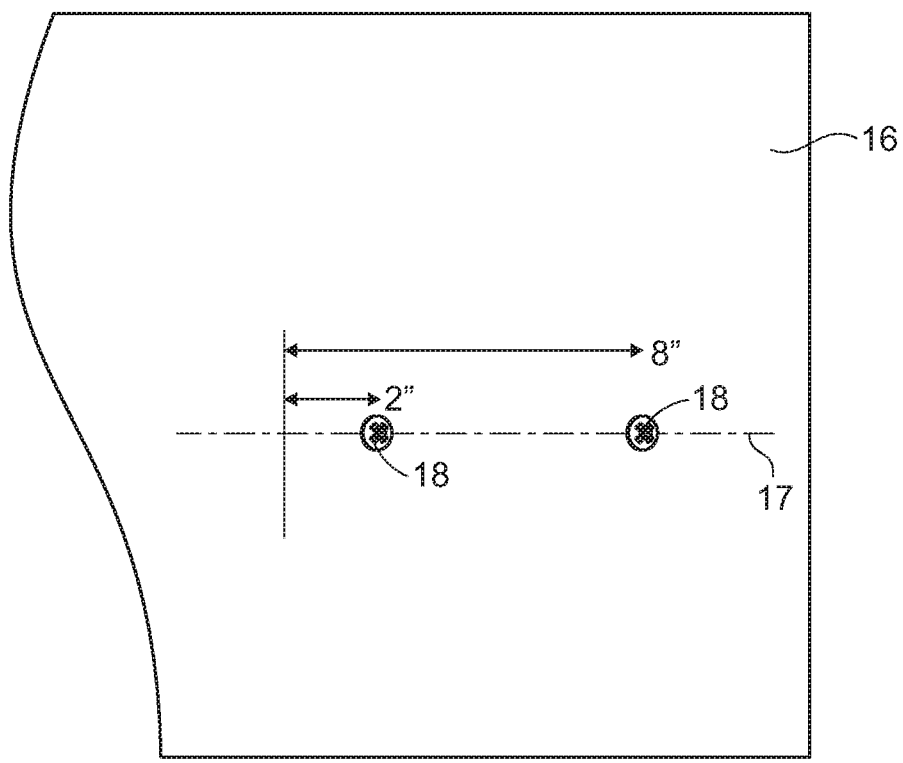
FIG. 23A is a frontal view illustrating positioning markings and fasteners of a conduit routing system in accordance with an example embodiment.
Figure 23B:
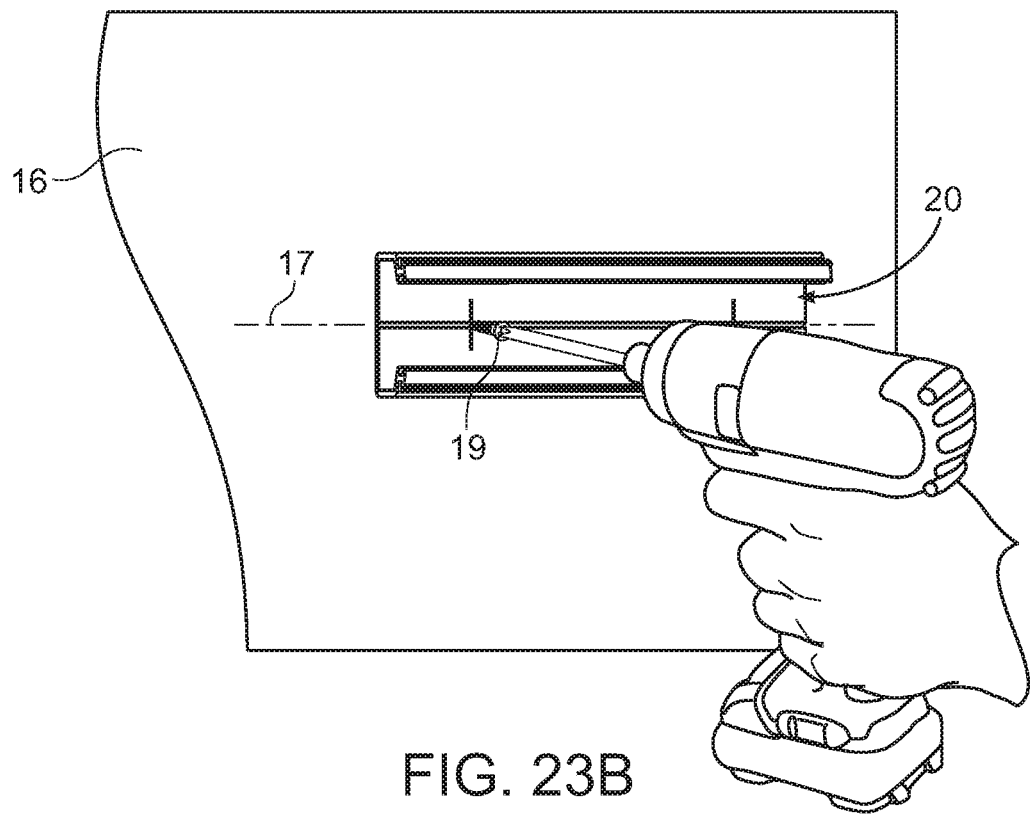
FIG. 23B is a frontal view illustrating connection of a channel member to a wall of a conduit routing system in accordance with an example embodiment.

FIGS. 22B and 23A illustrate markings 17 present on the structure 16 for aligning and positioning the channel member 20 during installation on the structure 16. Generally, markings 17 will be made on the structure 16 to cover the entire length of the completed raceway structure with a centerline marking 17. The centerline marking 17 provides a guide to the installer for the positioning and orientation of the channel members 20.

After the centerline marking 17 has been made on the structure 16, the channel member 20 may be perfectly positioned and aligned for installation by aligning with the centerline marking 17, such as with the notch 26, without the need for pre-drilling a pilot hole as shown in FIG. 23B. It should be understood that any method known to secure an object against a structure 16 may be utilized for securing the channel member 20 to the structure 16, including but not limited to drywall anchors 18, fasteners 19 such as screws or nails, adhesives such as glue, or any combination of the foregoing.

FIG. 24 illustrates the use of positioning notches 66, 67 on the couplers to assist with planning positioning of channel members 20 during installation. As shown in FIG. 24A, the positioning notches 66, 67 may include centerline notches 66 which may be utilized to align the coupler 50, 60, 61, 62, 63 along the marking 17 on the structure 16.

The positioning notches 66, 67 may also include edge locator positioning notches 67 which are utilized to mark the structure 16 to aid in locating where the channel member 20 edges should fall (or be cut) during the layout stage of installation. The end locator positioning notches 67 may be positioned at an offset location with respect to each of the ends 51, 52, 64 of the coupler 50, 60, 61, 62, 63 so as to identify the optimal position of the relevant end 21, 22 of the channel member 20 within the coupler 50, 60, 61, 62, 63 after installation. This marking 17 may be transferred to the channel member 20 as shown in FIG. 24B so that the channel member 20 may be cut to the desired length to fit within the coupler 50, 60, 61, 62, 63 utilized. An outline of the relevant positions on the coupler 50, 60, 61, 62, 63 may be created by markings 17 such as dots as shown in FIG. 24B on the structure 16. This can significantly reduce the amount of time necessary for installation of a conduit routing system 10 that utilizes one or more couplers 50, 60, 61, 62, 63.

FIGS. 25A, 25B, and 25C illustrate a conduit routing system 10 in which gaps are present that allow one or more conduits 12 to exit the channel member 20 at various locations along the system 10. FIG. 25A illustrates a pair of channel members 20 in spaced-apart relationship with a gap between through which one of the conduits 12 exits the channel 25. As shown in FIG. 25B, the cover 40 has been cut longer than the channel member 20 such that a portion of the cover 40 overhangs the channel member 20 to create a gap through which the conduit 12 may exit. A straight coupler 50 is shown in FIG. 25C to connect the covers 40 and channel members 20 together while retaining the gap for the conduit 12 to exit the channel 25 to be routed elsewhere.

Unless otherwise defined, all technical and scientific terms used herein have the same meaning as commonly understood by one of ordinary skill in the art to which this invention belongs. Although methods and materials similar to or equivalent to those described herein can be used in the practice or testing of the conduit routing system, suitable methods and materials are described above. All publications, patent applications, patents, and other references mentioned herein are incorporated by reference in their entirety to the extent allowed by applicable law and regulations. The conduit routing system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A conduit routing system, comprising:
a channel member for securing one or more conduits, wherein the channel member comprises a base, a first sidewall, a second sidewall, and a channel defined between the base, the first wall, and the second sidewall, wherein the base is adapted to be connected to a structure;
a first connector on the first sidewall of the channel member, the first connector comprising a first inner receiver slot and a first outer receiver slot, wherein the first connector comprises a first projection;
a second connector on the second sidewall of the channel member, the second connector comprising a second inner receiver slot and a second outer receiver slot, wherein the second connector comprises a second projection;
wherein the first connector and the second connector each comprise an elongated, T-shaped member;
a cover removably connected to the channel member so as to removably cover the channel, wherein the cover comprises a first groove on a first side of an underside of the cover and a second groove on a second side of the underside of the cover;
a connector strip connected between the channel member and the cover, wherein a first end of the connector strip is connected adjacent to the first groove of the cover and the first projection of the first connector, wherein a second end of the connector strip is connected adjacent to the second groove of the cover and the second projection of the second connector, wherein the connector strip extends across the channel between the first connector and the second connector; and
a securing member adapted to secure the one or more conduits within the channel, wherein the securing member is connected between the first inner receiver slot and the second inner receiver slot.

2. The conduit routing system of claim 1, wherein the cover is removably connected to the first outer receiver slot and the second outer receiver slot.

3. The conduit routing system of claim 2, wherein the cover comprises a first cover connector adapted to removably engage with the first outer receiver slot and a second cover connector adapted to removably engage with the second outer receiver slot.

4. The conduit routing system of claim 1, comprising a coupler removably connected over the channel member and the cover.

5. The conduit routing system of claim 4, wherein the coupler comprises a first coupler connector and a second coupler connector, each being adapted to engage between the cover and the channel member to secure the coupler over the cover and the channel member.

6. The conduit routing system of claim 4, wherein the coupler comprises an edge locator positioning notch for identifying an optimal position of a first end or a second end of the channel member when the coupler is connected over the channel member.

7. The conduit routing system of claim 6, wherein the coupler comprises a centerline positioning notch for optimal positioning and placement of the coupler.

8. The conduit routing system of claim 4, wherein the coupler comprises an elbow coupler.

9. The conduit routing system of claim 1, wherein the connector strip comprises double-sided tape.

10. A conduit routing system, comprising:
a channel member for securing one or more conduits, wherein the channel member comprises a base, a first sidewall, a second sidewall, and a channel defined between the base, the first wall, and the second sidewall, wherein the base is adapted to be connected to a structure, wherein the base of the channel member comprises a groove for alignment of the channel member, wherein the groove is positioned at a mid-point between the first sidewall and the second sidewall of the channel member;
a first T-shaped connector on the first sidewall of the channel member, the first T-shaped connector comprising a first inner receiver slot and a first outer receiver slot;
a second T-shaped connector on the second sidewall of the channel member, the second T-shaped connector comprising a second inner receiver slot and a second outer receiver slot;
a cover removably connected to the channel member so as to removably cover the channel, wherein the cover is adapted to engage with the first outer receiver slot and the second outer receiver slot of the channel member; and
a securing member adapted to secure the one or more conduits within the channel, wherein the securing member is connected between the first inner receiver slot and the second inner receiver slot.

11. The conduit routing system of claim 10, wherein the securing member is comprised of a resilient, elongated member.

12. The conduit routing system of claim 10, wherein the first and second T-shaped connectors each comprise a rib and a flange portion at an upper end of the rib.

13. The conduit routing system of claim 12, wherein the flange portion of the first T-shaped connector defines the first inner and outer receiver slots, wherein the flange portion of the second T-shaped connector defines the second inner and outer receiver slots.

14. The conduit routing system of claim 10, comprising a connector strip connected between the channel member and the cover.

15. The conduit routing system of claim 14, wherein the connector strip is connected to the flange portion of the first T-shaped connector and the flange portion of the second T-shaped connector.

16. The conduit routing system of claim 10, wherein the connector strip extends across the channel between the first T-shaped connector and the second T-shaped connector.

* * * * *